US009080023B2

(12) United States Patent
Jeong et al.

(10) Patent No.: US 9,080,023 B2
(45) Date of Patent: Jul. 14, 2015

(54) FOAM MOLDING METHOD, FOAMING AGENT AND FOAMED PLASTIC

(71) Applicant: LG ELECTRONICS INC., Seoul (KR)

(72) Inventors: Changhoon Jeong, Changwon-si (KR);
Daejin Jeong, Changwon-si (KR);
Gangyoun Kim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/081,273

(22) Filed: Nov. 15, 2013

(65) Prior Publication Data

US 2014/0213676 A1    Jul. 31, 2014

(30) Foreign Application Priority Data

Jan. 28, 2013 (KR) .................. 10-2013-0009294

(51) Int. Cl.
*B29C 44/36* (2006.01)
*B29C 44/00* (2006.01)
*B29C 47/38* (2006.01)
*C08J 9/00* (2006.01)
*B29C 44/34* (2006.01)
*C08J 9/08* (2006.01)

(52) U.S. Cl.
CPC ........... *C08J 9/0066* (2013.01); *B29C 44/3457* (2013.01); *C08J 9/08* (2013.01); *C08J 2201/024* (2013.01); *C08J 2201/03* (2013.01); *C08J 2203/02* (2013.01); *C08J 2203/08* (2013.01); *C08J 2300/22* (2013.01)

(58) Field of Classification Search
None
See application file for complete search history.

(56) References Cited

U.S. PATENT DOCUMENTS

| 5,234,963 A | 8/1993 | Garcia et al. ............... 521/76 |
| 5,643,969 A * | 7/1997 | Sakamoto et al. ........... 521/81 |
| 5,710,189 A | 1/1998 | Brandt ....................... 521/91 |
| 6,790,870 B1 * | 9/2004 | DeSimone et al. .......... 521/79 |
| 2003/0144369 A1 | 7/2003 | Marrelli ..................... 521/50 |
| 2004/0089971 A1* | 5/2004 | Hartman .................... 264/211 |
| 2008/0190924 A1 | 8/2008 | Bobrov et al. ........... 220/62.22 |
| 2012/0061867 A1 | 3/2012 | Dougherty, Jr. et al. ...... 264/13 |

FOREIGN PATENT DOCUMENTS

| EP | 0 260 843 A1 | 3/1988 |
| JP | 2004-250540 A | 9/2004 |
| JP | 2005-35866 A | 2/2005 |

(Continued)

OTHER PUBLICATIONS

European Search Report dated Oct. 8, 2014 issued in Application No. 13 194 686.5.

(Continued)

*Primary Examiner* — Kara Boyle
(74) *Attorney, Agent, or Firm* — KED & Associates, LLP

(57) ABSTRACT

A foam molding method, a foamed plastic formed by the method, and a foaming agent used in the foam molding method are provided. The foam molding method may include rotating a screw provided in a barrel, feeding a granular or powdered raw material and a foaming agent into the barrel, the foaming agent producing foam through a chemical reaction, melting the fed raw material and producing a gas from the foaming agent, and phase-changing the produced gas to a supercritical state and mixing the gas with the melted raw material.

13 Claims, 4 Drawing Sheets

(56) References Cited

FOREIGN PATENT DOCUMENTS

| JP | 2010-162765 A | | 7/2010 |
| JP | 2012-172075 A | | 9/2012 |
| JP | 2012172075 A | * | 9/2012 |
| KR | 10-2005-0055153 A | | 6/2005 |
| KR | 10-2010-0077791 A | | 7/2010 |
| WO | WO 91/02023 A1 | | 2/1991 |

OTHER PUBLICATIONS

Korean Office Action dated Feb. 13, 2014, issued in Application No. 10-2013-0009294.

European Search Report issued in Application No. 13 19 4686.5 dated Jun. 24, 2014.

Korean Notice of Allowance dated Jul. 18, 2014 issued in Application No. 10-2013-0009294.

* cited by examiner

FOAM MOLDING METHOD, FOAMING AGENT AND FOAMED PLASTIC

CROSS-REFERENCE TO RELATED APPLICATION(S)

This application claims priority under 35 U.S.C. §119 to Korean Application No. 10-2013-0009294 filed in Korea on Jan. 28, 2013, whose entire disclosure is hereby incorporated by reference.

BACKGROUND

1. Field

This relates to a foam molding method, a foaming agent and a foamed plastic.

2. Background

A foam molding method may be used to produce foamed plastic products by generating foam during a molding process and homogeneously dispersing the foam in a polymer resin. However, many of the methods for effectively molding foamed plastic products require the use of a considerably expensive device having a complicated structure.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to various embodiments, examples of which are illustrated in the accompanying drawings. Wherever possible, the same reference numbers will be used throughout the drawings to refer to the same or like parts.

Figure 1:
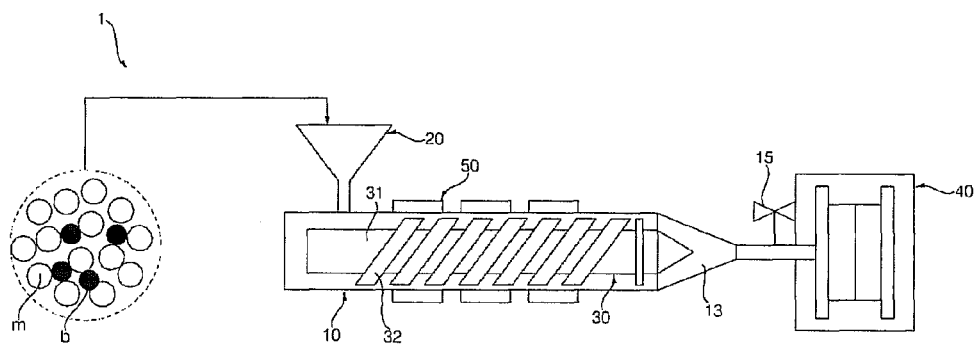
FIG. 1 illustrates an injection molding machine in accordance with an embodiment as broadly described herein.

Referring to FIG. 1, an injection molding machine 1 as embodied and broadly described herein may include a hopper 20 through which a raw material m and a foaming agent b may be fed, a barrel 10 filled with the raw material and the foaming agent fed through the hopper 20, and a screw 30 provided in the barrel 10 to mix the raw material with the foaming agent as it rotates in the barrel 10. The screw 30 may also inject a resin mixture obtained from the melted raw material (hereinafter, referred to as a "melted resin") and a gas component produced by the foaming agent through a nozzle 13 at an end of the barrel 10 into a die 40. A heater 50 may apply heat to the barrel 10 to melt the resin in the barrel 10. The screw 30 may include a screw axis 31, or shaft, supported in the barrel 10 so as to be rotatable, or movable forward and backward, in the barrel 10, and a blade 32 extending along the circumference of the screw axis 31, in, for example, a spiral pattern, or other pattern as appropriate.

A shut-off valve 15 may be provided on the end of the nozzle 13 or at an inlet of the die 40. The shut-off valve 15 may mechanically control a flow of a melted resin having a relatively low viscosity down through the nozzle 13. Upon injection, the shut-off valve 15 may open to allow the melted resin to be fed into the die 40. When the die 40 is opened or the screw 30 is moved backward for metering, the shut-off valve 15 may be closed, thus preventing the melted resin from leaking through the nozzle 13. In the case of a hot runner die, a valve provided at an end of the hot runner may control such flow, without a separately mounted shut-off valve 15.

In certain embodiments, the raw material m may be a non-thermosetting polymer plastic, and may be fed in the form of a granule or powder. However, embodiments are not necessarily limited thereto, and the raw material m may be fed in other manners, such as, for example, in a melted form.

The foaming agent may cause a chemical reaction that produces a gas in the process of heating and pressurization in the barrel 10. The produced gas may be dissolved in the melted resin in the barrel 10. That is, the foaming agent b may be a chemical foaming agent which undergoes a change in molecular structure through reaction under predetermined temperature and/or pressure conditions to produce a gas. In certain embodiments, the chemical foaming agent mixed with the raw material may be decomposed by heat applied during an injection process to produce a gas, and, a foamed plastic having fine pores may be formed. The foaming agent may be based on isocyanate used for foaming of polyurethane, an azo-, hydrazine or nitrogen-based compound used for foaming of water, thermoplastic plastics or elastomeric foams, an inorganic foaming agent such as sodium bicarbonate ($NaHCO_3$), or a foaming compound for foaming metal materials, such as powdery titanium hydride or zirconium (II) hydride. The chemical reaction which produces a gas from the foaming compound is irreversible and is not restored to an original substance in a melted resin.

The type and characteristics of the chemical foaming agent will be described in more detail. Azodicarbonamide (ADC) has a decomposition temperature of 200 to 230° C., the gas produced by decomposition may be $N_2$, $NH_3$ and/or $CO_2$, gas yield may reach 220 ml/g depending on temperature and pressure conditions and the decomposition is exothermic.

p-toluenesulfonylhydrazide (THS) has a decomposition temperature of 110 to 140° C., the gas produced by decomposition may be $N_2$ and/or $H_2O$, gas yield may reach 120 ml/g depending on temperature and pressure conditions and the decomposition is exothermic.

OBSH (4,4-oxybis (benzenesulfonyl hydrazide)) has a decomposition temperature of 140 to 165° C., gas produced by decomposition may be $N_2$, $CO_2$ and/or $H_2O$, gas yield may reach 125 ml/g depending on temperature and pressure conditions and the decomposition is exothermic.

5-phenyltetrazole (5-PT) has a decomposition temperature of 240 to 250° C., gas produced by decomposition may be $N_2$, gas yield may reach 200 ml/g depending on temperature and pressure conditions and the decomposition is exothermic.

Sodium bicarbonate ($NaHCO_3$) has a decomposition temperature of 150 to 230° C., gas produced by decomposition may be $CO_2$ and/or $H_2O$, gas yield may reach 165 ml/g depending on temperature and pressure conditions and the decomposition is endothermic. Citric acid may serve as a catalyst for reaction.

The foaming agents mixed with the raw material may be selected from various types of the afore-mentioned foaming agents. Of these, sodium bicarbonate suitably controls temperature and pressure conditions of the melted resin while transported in the barrel 10 by rotation of the screw 30 and thereby may provide some advantages in view of reaction control and gas generation mechanism control.

In addition, the foaming agent may satisfy the following conditions: 1) it may emit gas at a set time and temperature of a foam molding process, 2) it may have a uniform particle size and superior disperability in the mixture, 3) it may not emit a great amount of heat and may control decomposition temperature, 4) the decomposed gas does not corrode, 5) the foaming agent and a decomposition residue thereof may be low in toxicity and non-contaminant, 6) decomposition residue does not affect chemical and physical properties, 7) it does effect cross-linking or curing of polymers, 8) it may produce a relatively large amount of gas and be economical, and 9) it may be used according to resin to be foam-molded and processing methods. For example, sodium bicarbonate may be suited to these required conditions.

In certain embodiments, a ratio, for example, a weight ratio, of the raw material to the foaming agent may be less than or equal to approximately 5% and, in this embodiment, may be, for example, 100:1 to 100:3 (raw material: foaming agent, based on weight ratio).

The foaming agent may be mixed in the form of a compound with the raw material (for example, powdery or granular sodium bicarbonate may be mixed with the raw material), or may be fed in the form of a pellet of a master batch concentrated and dispersed together with the raw material. Alternatively, the compound may be incorporated into a predetermined carrier. The carrier may generally be referred to as a "cell", that is, a cross-sectional shape having a closed structure including two concentric circles formed by an outer circumferential surface and an inner circumferential surface of the carrier. The foaming compound may be accommodated in a closed space defined by the inner circumferential surface. The carrier may comprise a plastic such as, for example, low-density polyethylene (LDPE), polyethylene (PE) or polypropylene (PP).

The gas produced by thermal decomposition of the foaming agent may be homogeneously mixed with the melted resin in the barrel 10. For this purpose, physical mixing by driving of the screw 30 and a phase of the substance produced by chemical decomposition of the foaming agent are essential. The substance produced from the foaming agent based on pressure and temperature conditions in the barrel 10 may be mixed in a gas phase with the melted resin. In this case, it may take a relatively long time to mix the gas with the melted resin so that the gas is homogeneously dispersed in the melted resin, and may not be easily accomplished in view of the relatively low solubility of gas.

Figure 4:
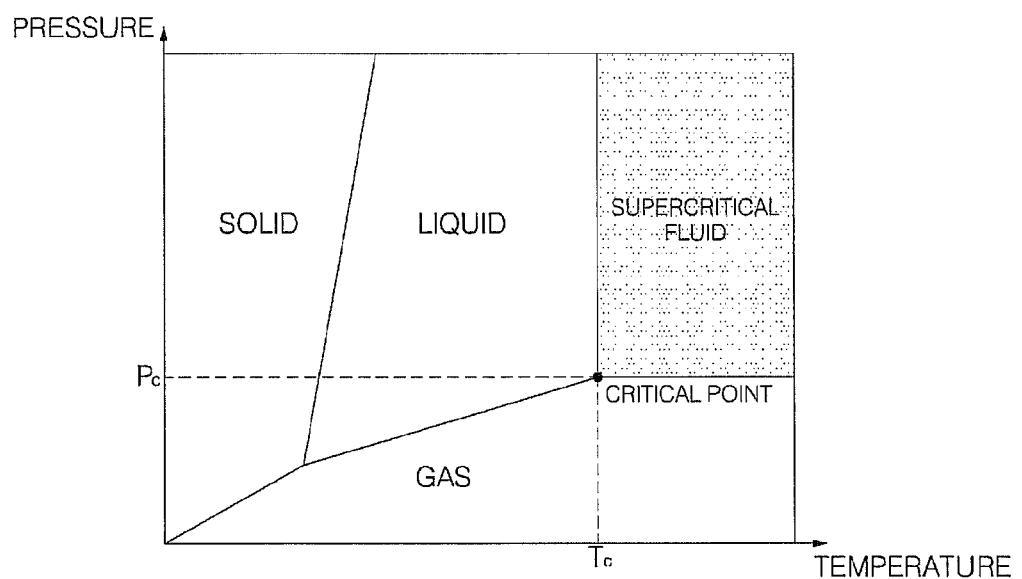
FIG. 4 is a phase diagram of carbon dioxide.

In general, a substance may be phase-changed to a solid, liquid or gas in response to particular temperature and pressure conditions. Under suitable temperature and pressure conditions, a substance may reach a "supercritical fluid (SCF)" state. Referring to FIG. 4, a supercritical fluid may be a substance at a temperature and pressure above its critical pressure (Pc) and critical temperature (Tc), which has inherent properties different from those of a general liquid or gas. A critical point means an uppermost limit at which a substance exists in liquid or gas phases in equilibrium. This phenomenon may be explained by the phase diagram shown in FIG. 4. Carbon dioxide exists in a gas, liquid or solid phase at a pressure and temperature below the critical points and respective curves indicate pressure and temperature conditions at which these two phases exist in equilibrium. That is, a curve between a liquid and a gas indicates a boiling point at individual pressure. As temperature or pressure increases along this curve, it reaches a critical point. Opposite changes occur, in that the liquid phase is decreased in density due to thermal expansion as temperature or pressure increases, while the gas phase is increased in density as a pressure increases. Then, at a high temperature and a high pressure above the critical point, the two phases have the same density and there is no longer distinction between the two phases. This state is referred as a supercritical state, in which the substance is easy to transform, freely flows and has fluid properties, and has a high solubility and a high diffusion degree, unlike a solid. For reference, the critical point of carbon dioxide is 73.8 bar at 31.1° C.

Figure 2:
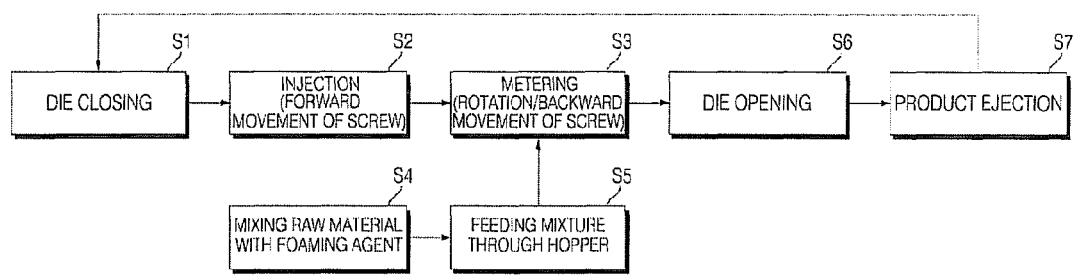
FIG. 2 is a flowchart of a foam molding method in accordance with an embodiment as broadly described herein.
Figure 3:
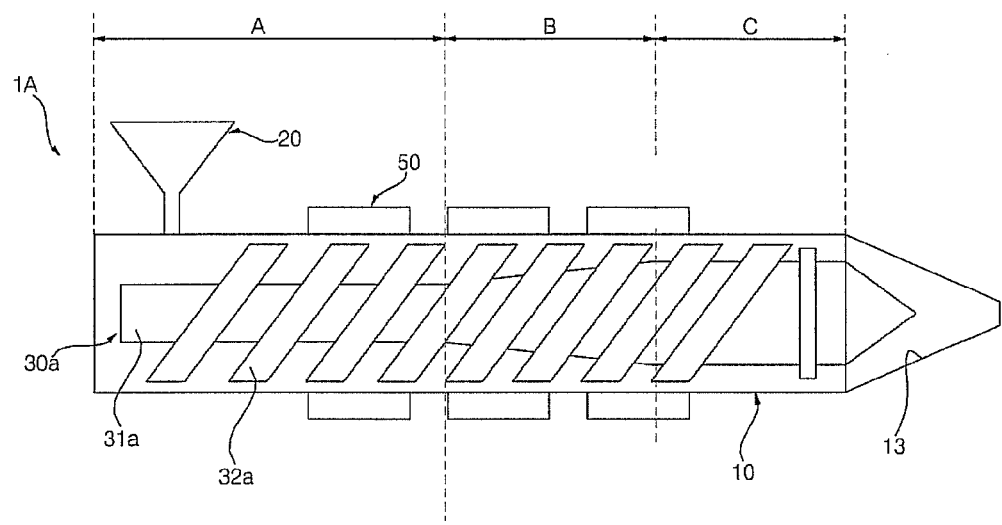
FIG. 3 illustrates an injection molding machine including a screw, in accordance with another embodiment as broadly described herein.

FIG. 2 illustrates a foam molding process according to one embodiment, and FIG. 3 illustrates an injection molding machine 1*a* having a screw 30*a*, in accordance with another embodiment. Description of the foam molding process with reference to FIG. 2 begins when metering has been completed (see S3) and the die 40 has been closed (S1). It will be understood that this state may be representative of any process of the overall injection molding process using the injection molding machine 1, and implementation does not necessarily begin from S1. In this regard, injection (S2) may be performed if the screw 30 moves forward after metering (S3). This is the same in the case of one of repeated injection cycles and in the case of a first injection cycle.

In a state in which a melted resin is filled in the barrel 10, that is, the melted resin is metered, a screw 30 moves forward and the melted resin is injected from the nozzle 13 into the die 40 (S2). The injection of the melted resin into the die 40 results in pressure drop, causing vaporization of gas components dissolved in the melted resin and formation of foams in the plastic. Accordingly, a final product cooled and hardened in the die 40 is a foamed plastic having uniformly formed fine pores.

Metering (S3) is a process of plasticizing a resin for the next injection operation, after the current injection operation is completed. The screw 30 moves backward, corresponding to a predetermined metered amount (one-shot) upon rotation, and a mixture of a raw material and a foaming agent (see S4) is fed in an amount corresponding to the metered amount through the hopper 20 (S5). The raw material is melted by heat applied by the heater 50 and friction due to rotation of the screw 30. In particular, when the screw 30 rotates, the raw material and the foaming agent are mixed and melted, are gradually transported toward the nozzle 13, and are then charged in an area between the barrel 10 and the screw 30.

Referring to FIG. 3, the raw material and the foaming agent fed into the barrel 10 pass through a first zone A, a second zone B and a third zone C, sequentially, as the screw 30 rotates.

The first zone A is a region in which the raw material and the foaming agent injected through the hopper 20 are fed into the barrel 10. The raw material and the foaming agent in the barrel 10 are heated by operation of the heater 50. In the first zone A, the raw material is melted, but chemical reaction of the foaming agent does yet not occur. In a case in which polypropylene is used as a raw material, a temperature of the first zone A may reach 180 to 220° C.

In particular, in a case in which the foaming agent is fed in the form of a cell, in the first zone A, in order to prevent a resin constituting a cell surrounding a foaming compound (hereinafter, referred to as a "carrier resin") from being melted, a type of the resin constituting the cell and an inner temperature and pressure of the barrel 10 may be controlled. The first zone A may be referred to as a "feeding zone" in which feeding and mixing of the raw material and the foaming agent for subsequent injection and melting of the raw material are performed therein.

In the second zone B, the raw material is melted and gas is produced from the foaming agent or the foaming compound via a thermal reaction. In a case in which sodium bicarbonate is used as the foaming compound, in accordance with the following equation 1, a primary reaction of sodium bicarbonate may occur to produce CO2, and sodium carbonate (Na2CO3), CO2 and H2O may remain as residues. In this case, citric acid (C6H8O7H2O) may be used as a catalyst. Citric acid as the catalyst may be added as a mixture thereof with a cell-form foaming agent as described above. Alternatively, the citric acid may be fed as a mixture thereof with the raw material and the foaming compound or foaming agent.

[Equation 1]

In particular, in a case in which the cell-form foaming agent is used, in the second zone B, the carrier resin may be melted, chemical reaction of the foaming compound may be facilitated and the produced gas may be dissolved in the melted resin. Material in the second zone B is a 2-phase state fluid in which the melted resin and the gas coexist.

Compression may also occur in the second zone B while fluids move along the screw $30$. As an amount of gas dissolved in the melted resin increases and pressure increases, the gas state may approach the supercritical state on a phase diagram.

Figure 5:
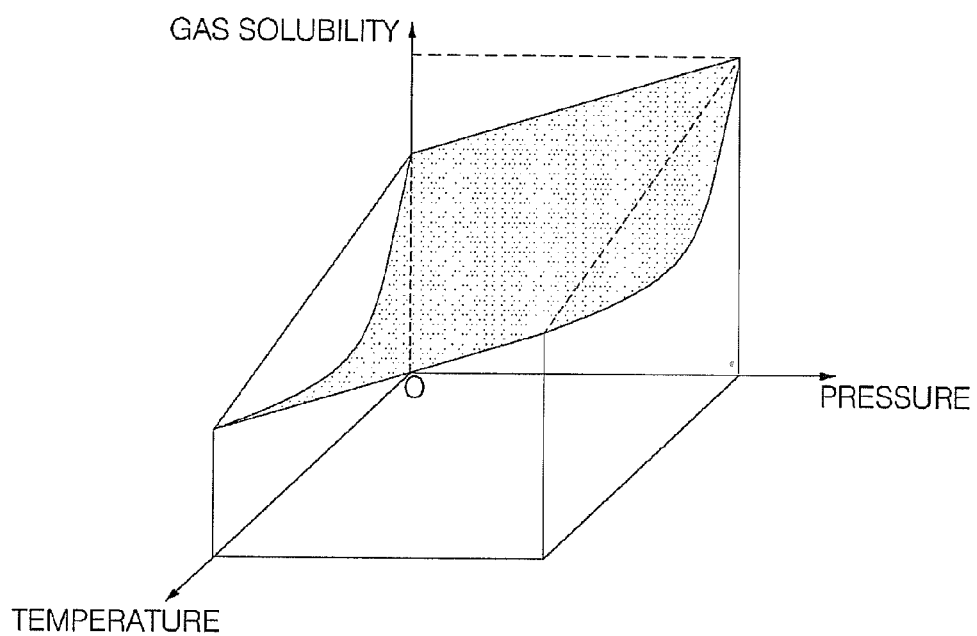
FIG. 5 is a graph showing a concentration of gas dissolved in a melted resin according temperature and pressure.

In order to increase pressure in the second zone B, in this embodiment, the gap between the screw axis $31a$ and the inner circumferential surface of the barrel $10$ gradually decreases in a fluid movement direction. However, embodiments are not necessarily limited thereto. According to various embodiments, a type of the blade $32a$, a pitch gap of the blade $32a$, and a gap between a tip of the blade $32a$ and the barrel $10$ may be adjusted as appropriate. An additional pressurization device may be further provided. The second zone B, in which fluids are compressed, may be referred to as a "compression zone". In a case in which polypropylene is used as the raw material, the temperature of the second zone B may reach 180 to 220° C. As shown in FIG. 5, solubility of the gas tends to increase, as pressure increases. Accordingly, the increase in pressure in the second zone B enables the gas produced from the foaming agent to be more well dissolved in the melted resin.

In the third zone C, most of the raw material enters a melt state. The gas produced from the foaming agent reaches a supercritical state and fluids in the barrel $10$ form one phase. The temperature and the pressure of the third zone C are at or above critical points of the gas.

In particular, in a case in which sodium bicarbonate is used as the foaming compound, in the third zone C, in accordance with the following Equation 2, decomposition of sodium carbonate occurs as a secondary reaction, carbon dioxide is produced and sodium oxide (Na2O) is left as a residue.

[Equation 2]

In the third zone C, pressurization and heating may be performed for a time sufficient to ensure that the gas reaches a supercritical state. In particular, the gas component may be homogeneously mixed in fluids. For this purpose, the shape of the blade $32a$, the pitch gap of the blade $32a$, and rotation velocity of the screw $30a$ may be determined so that fluids are slowly moved along the screw $30$. The temperature of the third zone C may be higher than the temperature of the second zone B, and may be, for example, 200 to 240° C. When the temperature of the third zone C is kept higher than that of the second zone B, it is understood that the temperature of the third zone C falls within a temperature range higher than the temperature of the second zone B.

In the third zone C, most of the raw material is melted and reaches a state in which it may be injected through the nozzle $13$. Accordingly, the third zone C may be referred to as a "melting (metering) zone".

As described above, when metering and melting of the raw material are completed while the raw material passes through the feeding zone (A), the compression zone (B) and the melting zone (C), the screw moves forward and an injection operation, in which the metered fluid is fed through the nozzle $13$ into the die $40$, is performed (S2). Due to a sharp decrease in pressure in the die $40$, the gas component dissolved in fluid is converted back into a gas phase, resulting in foaming of a plastic. At this time, the shut-off valve $15$ is in an open state, and foaming may be carried out according to a pressure decrease ratio (ΔP/Δt) while the fluid passes through the shut-off valve $15$. According to embodiments as broadly described herein, the shut-off valve $15$ may be implemented by a valve enabling control of pressure decrease ratio.

After metering (S3), the die $40$ is opened (S6) and the plastic foamed in the previous injection cycle is ejected from the die $40$ (S7). Then, the die $40$ closes again (S1), injection (S2) and metering (S3) are performed and molding of the foamed plastic may be repeated.

While the resin is cooled in the die $40$, most of the gas contributing to foaming may be discharged from the foamed plastic. For example, carbon dioxide may be discharged at 80% or more within 48 hours under suitable conditions. However, residue left after production of gas from the foaming agent may still exist in the foamed plastic. Examples of such a residue may include a carrier resin constituting the cell, sodium carbonate as a residue of the primary reaction of sodium bicarbonate, sodium oxide as a residue of the secondary reaction, and citric acid as the catalyst.

The foam molding method may be applied to extrusion molding as well as injection molding. Extrusion molding differs from injection molding in that the melted resin is not cooled in the die, but is otherwise substantially the same as injection molding in that a hopper, a barrel and a screw are provided, and melting and mixing of the resin and chemical reaction of the foaming agent are induced in the barrel.

The foam molding method as embodied and broadly described herein may be is effective in producing foamed plastics having uniformly distributed pores. Accordingly, such a foam molding method may provide improved in insulation, durability and weight reduction.

In addition, because the foam molding method does not require an additional device (for example, a supercritical fluid producer) for adding a gas to a resin, high quality foamed plastics may be produced in a simple and cost effective manner.

The foaming agent as embodied and broadly described herein may control a time at which gas is produced from the foaming agent during foam molding, as a cell surrounding a foaming compound may be melted according to inner temperature conditions of the barrel.

The foamed plastic as embodied and broadly described herein may exhibit superior insulation and durability, and may be advantageous in weight reduction, because pores are uniformly distributed in the foamed plastic.

A foamed plastic having uniformly distributed pores therein, a foam molding method to homogeneously dissolve and disperse gas components in a melted resin in the process of molding the foamed plastic, and a foaming agent for use in the method, are provided.

A foam molding method as embodied and broadly described herein may include rotating a screw provided in a barrel, feeding a granular or powdery raw material and a foaming agent for producing foams through a chemical reaction into the barrel, melting the fed raw material and producing a gas from the foaming agent, and phase-changing the produced gas into a supercritical fluid and mixing the gas with the melted raw material.

During the phase-changing and the mixing, a residue of the foaming agent left after the gas production may be decomposed and further produces the gas. A temperature of the barrel during the phase-changing and the mixing may be higher than a temperature of the barrel during the melting.

The foaming agent may include a foaming compound for producing a gas through a thermal reaction, and a cell for accommodating the foaming compound, wherein the temperature of the barrel during the melting is higher than a melting point of the cell.

During the melting, a mixture of the raw material and the foaming agent may be compressed between the barrel and the screw while the mixture is moved along the barrel upon rotation of the screw.

The foaming agent may include sodium bicarbonate (NaHCO3).

A foam molding method in accordance with another embodiment as broadly described herein may include feeding a granular or powdery raw material and a foaming agent into a first zone of a barrel while a screw rotates, melting the raw material and producing a gas from the foaming agent in a second zone while the raw material and the foaming agent are moved along the barrel upon rotation of the screw, and further producing the gas from a residue of the foaming agent left after production of gas in the second zone, in a third zone after the second zone.

During the further producing the gas, the gas produced from the foaming agent may be phase-changed into a supercritical fluid.

In the second zone, a pressure applied to a mixture of the raw material and the foaming agent may be increased, as compared to the first zone.

A temperature of the barrel in the third zone may be higher than a temperature at which the gas is produced from the foaming agent in the second zone.

The foaming agent may include sodium bicarbonate, sodium carbonate (Na2CO3) may be produced as a thermal decomposition residue of the sodium bicarbonate in the second zone, and sodium oxide (Na2O) may be produced as a thermal decomposition residue of the sodium carbonate in the third zone. The temperature of the second zone may be 180 to 220° C., and the temperature of the third zone may be 200 to 240° C.

The foaming agent may include a foaming compound for producing a gas through a thermal reaction, and a cell for accommodating the foaming compound, wherein the temperature of the second zone is equivalent to or higher than a melting point of the cell.

A foaming agent for producing a foamed plastic by producing a gas when a plastic raw material to be foam-molded is melted, as embodied and broadly described herein, may include a granular or powdery foaming compound and a cell for accommodating the foaming compound, the cell being decomposed during melting of the raw material.

The foaming compound may include sodium bicarbonate.

The cell may include at least one of LDPE, PE and PP.

The foaming agent may further include a catalyst for activating a reaction of the foaming compound. The catalyst may be citric acid.

A foamed plastic produced by melting a raw material to be foam-molded and a foaming agent for producing a gas through a chemical reaction, as embodied and broadly described herein, are provided, wherein the foamed plastic includes a foamed raw material having pores produced by the gas, distributed therein, and at least one of sodium oxide (Na2O) and sodium carbonate (Na2CO3) left after production of gas from the foaming agent.

The foamed plastic may further include a catalyst for activating a chemical reaction of the foaming agent. The catalyst may be citric acid.

The raw material may be a non-thermosetting polymer.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A method, comprising:
 rotating a screw provided in a barrel;
 feeding a granular or powdered raw material and a foaming agent into the barrel;
 melting the fed raw material, and producing a gas from the foaming agent; and
 phase-changing the produced gas to a supercritical state and mixing the gas in the supercritical state with the melted raw material.
2. The method of claim 1, wherein producing a gas from the foaming agent includes leaving a residue of the foaming agent after producing the gas, and wherein, during the phase-changing of the produced gas to the supercritical state and the mixing of the gas in the supercritical state with the melted raw material, the residue of the foaming agent is decomposed and further produces the gas.
3. The method of claim 2, wherein a temperature of the barrel during the phase-changing and the mixing is greater than a temperature of the barrel during the melting.
4. The method of claim 1, wherein the foaming agent comprises:
 a foaming compound producing the gas through a thermal reaction; and
 a cell accommodating the foaming compound, wherein a temperature of the barrel during the melting is higher than a melting point of the cell.
5. The method of claim 1, wherein melting the fed raw material and producing a gas from the foaming agent comprises compressing a mixture of the fed raw material and the foaming agent between the barrel and the screw as the mixture moves along the barrel in response to rotation of the screw.
6. The method of claim 1, wherein the foaming agent comprises sodium bicarbonate ($NaHCO_3$).

7. A method, comprising:
   feeding a granular or powdered raw material and a foaming agent into a first zone of a barrel as a screw provided in the barrel rotates;
   melting the raw material and producing a gas from the foaming agent in a second zone of the barrel as the raw material and the foaming agent move along the barrel in response to rotation of the screw within the barrel; and
   further producing the gas, in a third zone of the barrel, from a residue of the foaming agent left after production of gas in the second zone.

8. The method of claim 7, wherein further producing the gas comprises phase-changing the gas produced from the foaming agent into a supercritical fluid.

9. The method of claim 7, further comprising applying a pressure to a mixture of the raw material and the foaming agent in the second zone, the pressure applied in the second zone being greater than a pressure applied in the first zone.

10. The method of claim 7, wherein a temperature of the barrel in the third zone is greater than a temperature at which the gas is produced from the foaming agent in the second zone.

11. The method of claim 7, wherein the foaming agent comprises sodium bicarbonate, and
    wherein melting the raw material and producing a gas from the foaming agent in a second zone further comprises producing sodium carbonate ($Na_2CO_3$) as a thermal decomposition residue of the sodium bicarbonate in the second zone, and
    further producing the gas from a residue of the foaming agent left after production of gas in the second zone comprises producing sodium oxide ($Na_2O$) as a thermal decomposition residue of the sodium carbonate in the third zone.

12. The method of claim 11, wherein the temperature of the second zone is 180 to 220° C., and the temperature of the third zone is 200 to 240° C.

13. The method of claim 7, wherein the foaming agent comprises:
    a foaming compound producing a gas through a thermal reaction; and
    a cell accommodating the foaming compound,
    wherein a temperature of the second zone is greater than or equal to a melting point of the cell.

\* \* \* \* \*